(12) United States Patent
Thomas et al.

(10) Patent No.: US 12,024,408 B2
(45) Date of Patent: Jul. 2, 2024

(54) DEVICE FOR LOCKING AN OBJECT SUSPENDED ON A CABLE

(71) Applicant: THALES, Courbevoie (FR)

(72) Inventors: Philippe Thomas, Brest (FR); François Warnan, Brest (FR)

(73) Assignee: THALES, Courbevoie (FR)

( * ) Notice: Subject to any disclaimer, the term of this patent is extended or adjusted under 35 U.S.C. 154(b) by 372 days.

(21) Appl. No.: 17/618,451

(22) PCT Filed: Jun. 11, 2020

(86) PCT No.: PCT/EP2020/066163
§ 371 (c)(1),
(2) Date: Dec. 11, 2021

(87) PCT Pub. No.: WO2020/249656
PCT Pub. Date: Dec. 17, 2020

(65) Prior Publication Data
US 2022/0250883 A1    Aug. 11, 2022

(30) Foreign Application Priority Data
Jun. 13, 2019   (FR) ...................................... 1906287

(51) Int. Cl.
*F16G 11/14*        (2006.01)
*B66D 1/60*         (2006.01)
(Continued)

(52) U.S. Cl.
CPC ................. *B66D 1/60* (2013.01); *B66D 5/16* (2013.01); *F16G 11/04* (2013.01); *G01S 7/521* (2013.01); *B64D 1/02* (2013.01); *B66D 1/02* (2013.01)

(58) Field of Classification Search
CPC .. B66D 1/60; B66D 5/22; F16G 11/00; F16G 11/106
See application file for complete search history.

(56) References Cited

U.S. PATENT DOCUMENTS 4,093,042 A * 6/1978 Pradon .................. F16G 11/048
 188/189
4,643,609 A    2/1987 Biass
(Continued)

FOREIGN PATENT DOCUMENTS

DE           20202645 U1    6/2003
WO        2015/092066 A1    6/2015

*Primary Examiner* — Lee D Wilson
(74) *Attorney, Agent, or Firm* — BakerHostetler (57) ABSTRACT

A device for locking an object suspended from a cable passing through a clamp and extending along a substantially vertical axis, the clamp includes a fixed part, at least two moving jaws, a first actuator and a second actuator, the two jaws coming into contact with the cable to immobilize the cable by clamping in a closed position and moving away from the cable in an open position, the fixed part having as many inclined surfaces as there are jaws, each of the jaws being configured to slide along one of the inclined surfaces so as to pass from the open position to the closed position, the first actuator being configured to move the jaws upward, make them slide along their respective inclined surface and allow the clamp to close, the second actuator being configured to pull downward on the cable with respect to the fixed part and allow the clamp to open.

15 Claims, 5 Drawing Sheets

(51) Int. Cl.
*B66D 5/16* (2006.01)
*F16G 11/04* (2006.01)
*G01S 7/521* (2006.01)
*B64D 1/02* (2006.01)
*B66D 1/02* (2006.01)

(56) References Cited

U.S. PATENT DOCUMENTS

| | | | | |
|---|---|---|---|---|
| 5,015,023 | A | 5/1991 | Hall | |
| 5,083,350 | A * | 1/1992 | Sandreid | F16G 11/106 |
| | | | | 24/68 CD |
| 7,165,295 | B2 * | 1/2007 | DeWitt | F16G 11/101 |
| | | | | 24/132 WL |
| 8,333,357 | B2 * | 12/2012 | Laughlin | F16G 11/101 |
| | | | | 188/65.1 |
| 8,826,841 | B2 * | 9/2014 | Moreau | B66D 3/006 |
| | | | | 114/218 |
| 10,626,684 | B2 * | 4/2020 | Drenth | B66C 1/56 |
| 10,774,600 | B2 * | 9/2020 | Zouhair | E21B 19/07 |
| 2012/0110791 | A1 * | 5/2012 | Giemza | F16G 11/106 |
| | | | | 24/136 R |
| 2014/0041967 | A1 * | 2/2014 | Wei | B66B 5/22 |
| | | | | 187/350 |
| 2014/0158476 | A1 * | 6/2014 | Wei | B66B 1/32 |
| | | | | 188/65.1 |
| 2014/0264209 | A1 | 9/2014 | Lin | |
| 2022/0250883 | A1 * | 8/2022 | Thomas | G10K 11/006 |
| 2022/0252135 | A1 * | 8/2022 | Thomas | F16G 11/04 |

* cited by examiner

DEVICE FOR LOCKING AN OBJECT SUSPENDED ON A CABLE

CROSS-REFERENCE TO RELATED APPLICATIONS

This application is a National Stage of International patent application PCT/EP2020/066163, filed on Jun. 11, 2020, which claims priority to foreign French patent application No. FR 1906287, filed on Jun. 13, 2019, the disclosures of which are incorporated by reference in their entirety.

The present invention relates to a device for locking an object suspended from a cable. The invention allows the object to be positioned at different positions along the cable. The invention proves to be particularly useful in the field of sonar detection and, more specifically, for an airborne sonar often referred to as "dipping sonar". This particular field consists in submerging a sonar antenna at a desired depth from a helicopter or a drone.

BACKGROUND

In the context of anti-submarine warfare, in order to be able to detect submerged submarines in a given region, sonars, in particular active sonars, are generally employed. In this context, the deployment of sonars from airborne platforms (helicopters or drones) has proven to be especially effective, as such platforms are highly mobile with respect to submarines.

More precisely, helicopters are used to deploy sonar transmitters and receivers that are linked by a cable to their platform (in other words the helicopter). These are then referred to as "dipping sonars". Below, the submerged cable-linked sub-assembly is called an antenna. It comprises the actual sonar transmitters and receivers, and potentially electronic equipment associated with the transmitters and receivers. It may also comprise environmental sensors.

More generally, the invention is concerned with any object that is to be hung from a carrier, whether this be in the air or in water.

Returning to the subject of dipping sonars, as known, a winch located inside the helicopter is used to drop the antenna into the water from the platform, to control the immersion of the antenna in the water and to recover the antenna. The cable is fixed to the antenna and the depth of immersion is adjusted from the helicopter by hauling in or paying out the cable.

When lowering and raising the antenna by means of the winch, the cable generates significant drag in the water. This drag increases with the depth reached by the antenna, because of the length of paid-out cable. The speed at which the antenna is lowered and raised is thus limited by the drag generated by the movement of the cable. The larger the depth, the slower the speed at which the antenna must be lowered, because the antenna is drawn downwards only by its weight minus its own drag and the drag of the cable. When the antenna is raised, the winch must exert, on the cable, a force equal to the weight of the antenna plus the overall drag. A winch capable of handling a substantial drag might be used. The cable has to be dimensioned to withstand the tensile force exerted by the winch. The higher this force, the larger the cross section of the cable must be, this tending to increase drag further.

In order to limit the drag of the cable in its movements through the water, the applicant company has explored the possibility of situating the winch inside the antenna. There then arises the problem of locking the antenna to the cable.

The winch positioned inside the antenna can easily perform this function by means of a brake able to block the winch actuator. This brake may be active, or in other words is actuated, as long as the antenna is not moving. Alternatively, the brake may be a passive brake. In other words, the brake is actuated when the winch is in motion. In both instances, whether the brake is an active brake or passive brake, the energy expenditure in operating the brake extends over a significant length of time, during the phase of immobility of the antenna in the case of the active brake, or during the phases of operation of the winch in the case of the passive brake.

SUMMARY OF THE INVENTION

The invention seeks to reduce the energy expenditure of the brake by making use of the weight of the antenna. The invention can be implemented even in the absence of a winch in the antenna, for example in order to slide an antenna, or more generally an object that is to be positioned along the cable.

To this end, the subject of the invention is a locking device for locking an object suspended from a cable, the device comprising a cable and a clamp, the cable passing through the clamp and extending along a substantially vertical axis, the clamp comprising: a fixed part connected to the object, at least two moving jaws, a first actuator and a second actuator, the two jaws being capable of translational movement relative to one another in a direction perpendicular to the axis of the cable, the two jaws coming into contact with the cable to immobilize the cable by clamping in a closed position and moving away from the cable in an open position, the fixed part having as many inclined surfaces as there are jaws, the inclined surfaces being inclined with respect to the axis of the cable so as to move closer to the axis of the cable toward the top, each of the jaws being configured to slide along one of the inclined surfaces, the sliding allowing the jaws to pass from the open position to the closed position, the clamp further comprising elastic elements configured to move the jaws away from the cable, the first actuator being configured to move the jaws upward, make them slide along their respective inclined surface and allow the clamp to close, the second actuator being configured to pull downward on the cable with respect to the fixed part and allow the clamp to open.

The elastic elements are advantageously positioned between each of the jaws and tend to part the jaws from one another.

The jaws are advantageously uniformly distributed radially about the axis of the cable and the movement of the jaws is symmetrical with respect to the axis of the cable.

The fixed part advantageously comprises as many grooves as there are jaws, each jaw sliding in one of the grooves, the inclined surface associated with the jaw concerned forming a bottom of the groove, the groove being configured to provide lateral guidance for the jaw concerned in a radial plane about the axis of the cable.

In a radial plane about the axis of the cable, each jaw advantageously has a cross section substantially in the shape of a rectangular trapezium of which a first side, flanked by two right angles, is parallel to the axis of the cable and belongs to a first face of the jaw concerned, the first face being configured to come to press against the cable and of which a second side, opposite the first side, belongs to a second face of the jaw concerned, the second face coming into contact with an inclined surface.

The inclined surfaces are advantageously inclined by an angle α with respect to the axis of the cable, a coefficient of friction f2 being defined between the jaws and the cable, and the coefficient of friction f2 is greater than or equal to the tangent of the angle α so as to render the clamp self-locking under the effect of the weight of the object.

A coefficient of friction f1 is advantageously defined between each jaw and the corresponding inclined surface, the coefficient of friction f1 being substantially zero.

Alternatively, the coefficient of friction f2 is greater than or equal to the tangent of the sum of the angle α and of the arc-tangent f1 so as to render the clamp self-locking under the effect of the weight of the object.

The second actuator is advantageously a winch positioned inside the object and configured to haul in and pay out the cable.

Each jaw advantageously comprises a first face that comes to press against the cable, the first face having a shape complementing that of the cable.

The fixed part may have a degree of freedom of translational movement along the axis with respect to the object.

The fixed part may be connected to the object by means of a second elastic element.

The second elastic element is advantageously configured to allow flexibility of the fixed part with respect to the object in translational movement along the axis and also in other degrees of freedom.

The second elastic element is advantageously configured to convert the majority of the kinetic energy of the object into potential energy in the deformation of the elastic element.

The second elastic element advantageously has damping properties able to dissipate the potential energy derived from the kinetic energy of the object.

BRIEF DESCRIPTION OF THE DRAWINGS

The invention will be better understood and further advantages will become apparent from reading the detailed description of one embodiment provided by way of example, which description is illustrated by the attached drawing, in which.

For the sake of clarity, elements that are the same have been designated with the same references in the various figures.

DETAILED DESCRIPTION

The detailed description of the invention is given in connection with a dipping sonar and more specifically a sonar antenna hanging from a cable fixed to a carrier. The invention is not limited to a sonar and can be employed for any object hanging from a cable and able to slide along the cable.

Figure 1A:
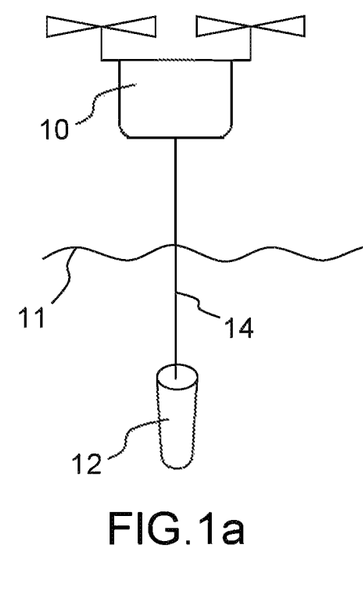
FIGS. 1a and 1b show various carriers each equipped with one dipping sonar.
Figure 1B:
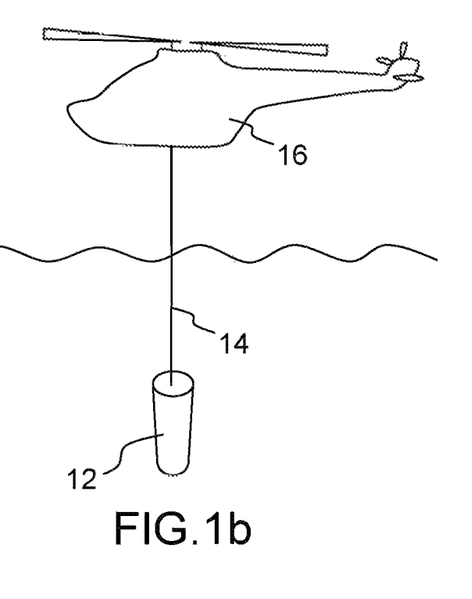

FIG. 1a shows a drone 10 hovering above water, the surface of which has been given the reference number 11. The drone 10 is equipped with an active dipping sonar comprising an antenna 12 attached to the drone 10 by a cable 14. This type of sonar in particular allows submarine objects to be detected and classified. FIG. 1b shows a helicopter 16 also equipped with an active dipping sonar comprising the antenna 12 attached to the helicopter 16 by the cable 14. Any type of carrier capable of positioning itself above the water may be equipped with an active dipping sonar. The carrier is able to lower the antenna to a desired depth under water, to conduct an acoustic detection phase, and to raise the antenna in order to terminate its mission or in order to carry out other missions.

Figure 2:
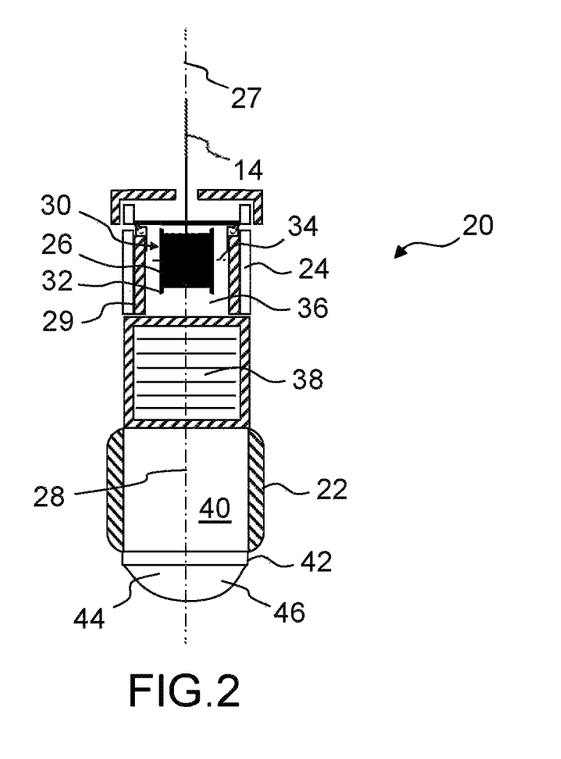
FIG. 2 shows a first variant embodiment of an antenna of the dipping sonar of FIGS. 1a and 1b.

FIG. 2 shows a first variant embodiment of an antenna 20 of an active dipping sonar. The antenna 20 is equipped with acoustic transmitters 22, acoustic receivers 24 and a motorized winch 26. The winch 26 is used to haul in and pay out the cable 14. A free end 27 of the cable 14 allows the antenna 20 to be attached to the carrier, such as the drone 10 or the helicopter 16. The antenna 20 extends along an axis 28 that is vertical when the antenna 20 is hanging from the cable 14 and is only subjected to gravity. The antenna 20 has a shape that is substantially of revolution about the axis 28. The acoustic transmitters 22 and the acoustic receivers 24 are placed radially around the axis 28.

The acoustic transmitters 22 and the acoustic receivers 24 may be fastened to a casing 29 of the antenna 20. The acoustic transmitters 22 and the acoustic receivers 24 may be placed in separate regions of the antenna 20, the regions being superposed on each other as shown in FIG. 2. Alternatively, the regions may be interspersed, as for example described in the patent application published under No. WO2015/092066 and filed in the name of the applicant.

The winch 26 is motorized by means of an actuator 30. More precisely, the actuator 30 allows a reel 32 on which the cable 14 is wound to be rotated. The actuator 30 may be an electric or hydraulic motor, or more generally a motor employing any form of energy able to operate in a confined space without air renewal. It is advantageously located inside the reel 32 in order to free up space in the antenna 20. The cable 14, as regards its paid-out portion, extends along the vertical axis 28. The antenna 20 hangs under the effect of gravity. In FIG. 2, the reel 32 rotates around a horizontal axis 34. Alternatively, the cable 14 may be wound around a reel with a vertical axis. A reeling mechanism allows the cable 14 to be stowed on the reel 32. The reeling mechanism makes a cable guide perform a back-and-forth translational movement along the axis of the reel, in order to stow the cable 14 in successive layers on the reel 32. In the case of a vertical-axis reel, the reel may remain stationary, and the reeling mechanism then rotates around the reel in addition to making its translational movement. Such mechanisms in particular exist in fishing reels. Alternatively, the reel may rotate about its axis and the guide of the reeling mechanism move only translationally with respect to a casing 29 of the antenna 20.

The winch 26 formed from the reel 32 and from the actuator 30 is placed inside the antenna 20, for example in an internal volume 36 located between the acoustic receivers 24.

The antenna 20 also comprises electronic modules 38 in particular allowing the acoustic signals transmitted by the transmitters 22 to be generated, the acoustic signals received by the receivers 24 to be processed, and the actuator 30 to be driven.

The electrical power necessary for the operation of all the components of the antenna 20 may come from the carrier and be delivered via the cable 14. However, this solution requires the cross-sectional area of the cable 14 to be increased in order to be capable of carrying all of the power required. In particular, the acoustic transmitters need to be supplied with a high instantaneous power, which may be of the order of several kilowatts. Since the cable 14 may be more than several hundred meters in length, it is then necessary to provide a cable the cross-sectional area of which is large enough to limit the effects of ohmic losses along the cable 14. This tends to increase the dimensions of the reel 32, which must be able to accommodate almost all of the length of the cable 14. In addition, during acoustic transmission phases, the transmission of data through the cable must be interrupted to prevent any corruption of the data by the transmission of power through the cable 14.

To limit periods of high power transfer through the cable 14, it is advantageous for the antenna 20 to be equipped with a battery 40, which is advantageously placed in a lower portion of the antenna 20, or at the very least below the volume 36 containing the winch 26, in order to allow the antenna to preserve a better vertical orientation, in particular during lowering when it is hanging by the cable 14. The battery 40 may be intended to smooth the transfer of electrical power through the cable 14, this making it possible to decrease the cross-sectional area of the electrical conductors of the cable 14. To this end, the battery 40 may supply power to the acoustic transmitters 22 which, conventionally, transmit at high power for a small fraction of the duration of a mission. It is also advantageous to completely dispense with power transfer through the cable 14. The battery 40 then supplies power to all the electrical loads of the antenna, such as in particular the winch 26, the electronic modules 38, and the acoustic transmitters 22 and receivers 24. To recharge the battery 40, the antenna comprises recharging means that are independent of the cable 14, such as for example a specific connector or a recharging region 42 that is contactless, and for example inductive. The battery 40 may be recharged on board the carrier 10 or 16 by connecting the specific connector or by placing the region 42 near a dedicated inductor.

The antenna 20 may also comprise environmental sensors such as a sounder 44 allowing the distance from the antenna 20 to the seabed to be determined, and a temperature sensor 46 allowing the variation in the temperature of the water as a function of the depth reached by the antenna 20 to be measured. Specifically, the propagation of sound waves in water depends on the variation in the temperature of the water. These sensors may also be powered by the battery 40.

Figure 3A:
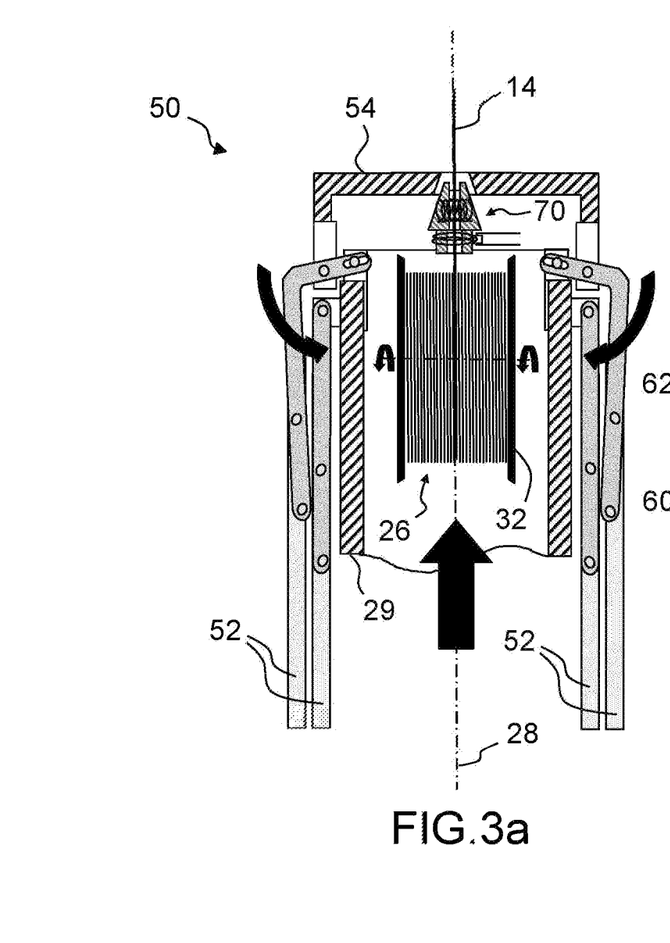
FIGS. 3a and 3b show a second variant embodiment of an antenna of the dipping sonar of FIGS. 1a and 1b.
Figure 3B:
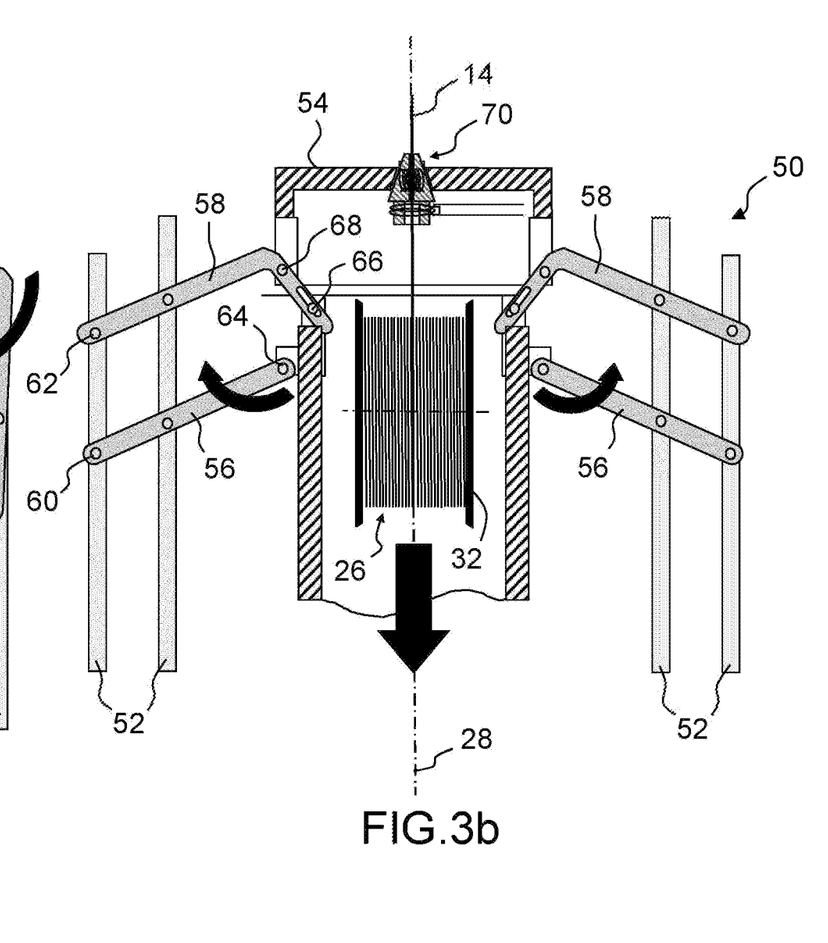

FIGS. 3a and 3b show a second variant embodiment of the antenna 50 of an active dipping sonar according to the invention. In this variant, during sonar reception, the acoustic receivers 24, which are possibly placed on arms, are deployed away from the casing 29 of the antenna 50. In contrast, during operation of the winch 26, the acoustic receivers 24 are stowed against the casing 29 in order to limit the drag of the antenna 50 while the antenna 50 is being lowered and raised in the water. This type of deployable antenna has already been developed by the applicant. In this type of antenna, the acoustic receivers are deployed by means of an electromechanical mechanism placed in the antenna. This mechanism comprises an electric motor that moves arms bearing the acoustic receivers. The motor is actuated both to deploy and to retract the arms. This mechanism is heavy and bulky.

It is possible to keep in the antenna such an electromechanical mechanism for moving arms bearing the acoustic receivers 24. Alternatively, the second variant allows this mechanism to be dispensed with.

The antenna 50 comprises deployable arms 52 on which the acoustic receivers 24 are placed. The arms 52 are advantageously regularly distributed around the axis 28, in order to ensure complete acoustic detection around the axis 28. FIG. 3a partially shows the antenna 50, in which the arms 52 are folded against the casing 29. FIG. 3b also partially shows the antenna 50, in which the arms 52 are deployed away from the casing 29. The arms 52 are hinged with respect to the casing 29 and with respect to a body 54 forming an annulus-shaped cover that is able to move translationally with respect to the casing 29 along the axis 28. The body 54 is for example of revolution about the axis 28 and the cable 14 passes through the body 54 via the hole in the annulus.

This two-hinge approach allows the arms 52 to move away from or come closer to the casing 29 during the movement of the body 54. More precisely, in the position of the body 54 shown in FIG. 3a, the arms 52 are folded against the casing 29, and in the position of the body 54 shown in FIG. 3b, the arms 52 are deployed away from the casing 29.

The arms 52 may be hinged directly to the casing 29 and to the body 54 by means of pivot links. Once deployed, the arms 52 lie horizontal or are inclined with respect to the axis 28. The dynamics of this type of mechanism are very simple. These dynamics are employed in particular in sonar buoys, in which the carrier floats on the surface of the water. However, this orientation of the arms may degrade the acoustic detection when the carrier is a drone or a helicopter. Specifically, in this orientation, the acoustic receivers 24 are affected by the noise generated by the carrier. It may therefore be preferable to make provision for the arms 52 to have a vertical orientation when they are deployed. In other words, it may be desirable to keep the arms parallel to the axis 28 during the translational movement of the body 54. To do this, the arms 52 may be hinged by way of a four-bar deformable-parallelogram linkage. More precisely, two bars 56 and 58 having parallel segments are hinged on the one hand to an arm 52, by means of links 60 and 62, respectively, and on the other hand to the casing 29, by means of links 64 and 66, respectively. One of the bars, the bar 58 in the example shown, is hinged to the body 54, by means of the link 68, at a point located away from the point where the bar is hinged to the arm 52, and away from the point where the bar is hinged to the casing 29. Thus, when the body 54 moves translationally, the bar 58 pivots about its hinge to the casing 29 and drives the arm 52. The bar 56 is driven by the arm 52 and also pivots with respect to the casing 29. During this movement, the orientation of the arm 52 with respect to the casing 29 does not vary. In the example shown, the arm 52 remains parallel to the axis 29. As shown, it is possible to hinge a plurality of arms 52, two in the example shown, to the same two bars 56 and 58. More precisely, each of the two arms 52 is hinged to the bar 58 and to the bar 56. As specified above, the antenna 50 may be equipped with a plurality of arms 52 distributed around the axis 28. To bear these various arms 52, the antenna 50 is equipped with a plurality of series of two bars 56 and 58 that are also distributed radially around the axis 28.

The translational movement of the body 54 with respect to the casing 29 may be achieved by means of an electromechanical actuator that ensures this movement directly. The actuator is for example formed from a linear hydraulic cylinder the body of which is fastened to the casing 29 and the rod of which, which moves translationally with respect to the body of the actuator, is fastened to the body 54. The inverse configuration is also possible.

Advantageously, it is possible to dispense with an actuator between the casing 29 and the body 54, by using the forces due to gravity exerted on the casing 29 and on the body 54. Specifically, the casing 29 may contain heavy components of which advantage may be taken to deploy the arms 52. To do this, the body 54 is equipped with a clamp 70 that is configured to clamp the cable 14 and to immobilize it with respect to the body 54.

When the clamp 70 is in the open position, the cable 14 is free with respect to the body 54 and its weight, associated with that of the arms 52 via the hinge 68, drives the body 54 downwards, i.e. towards the casing 29. In this position, the arms 52 are also driven downwards, i.e. to the position folded against the casing 29. This clamp-open position is shown in FIG. 3a.

When the clamp 70 is in the closed position, the cable 14 is immobilized with respect to the body 54. In this position, it is possible to activate the winch 26 so as to pay out the cable and thus allow the casing 29 and the equipment fastened thereto to be lowered with respect to the body 54 under the effect of gravity. This relative movement of the body 54 with respect to the casing 29 causes the arms 52 to be deployed to the position shown in FIG. 3b. This is possible if the arms 52, and where appropriate the bars 56 and 58, are lighter than the casing 29 and all the components that are fastened thereto. This condition is generally easily met due to the presence of heavy components, in particular the battery 40 and the winch 26, in the casing 29. The activation of the winch 26 with a view to paying out the cable 14 after the clamp 70 has been closed is carried out in a manner that is coordinated with the relative movement of the body 54 with respect to the casing 29. More precisely, the length of cable paid out is substantially equal to the length of the translational movement of the body 54 with respect to the casing 29. Paying out a longer length of cable would run the risk of causing the presence of slack cable between the reel 32 and the clamp 70. Paying out a shorter length of cable would not allow the arms 52 to be completely deployed. It is possible to control the deployment of the arms 52 by activating the winch 26.

Like with the deployment of the arms 52, the clamp 70 makes use of gravity in order to maintain its closed position, thereby making it possible to reduce the expenditure of energy in operating the clamp. Of course, the clamp 70 may be used with the antenna 20 described in FIG. 2, which is to say without deployable arms.

Figure 4A:
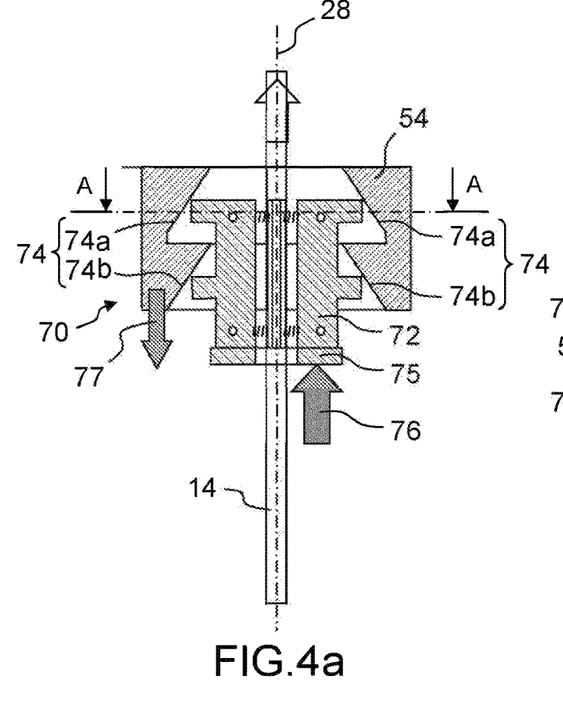
FIGS. 4a, 4b, 4c and 4d describe the principle of operation of a clamp involved in a locking device according to the invention.
Figure 4B:
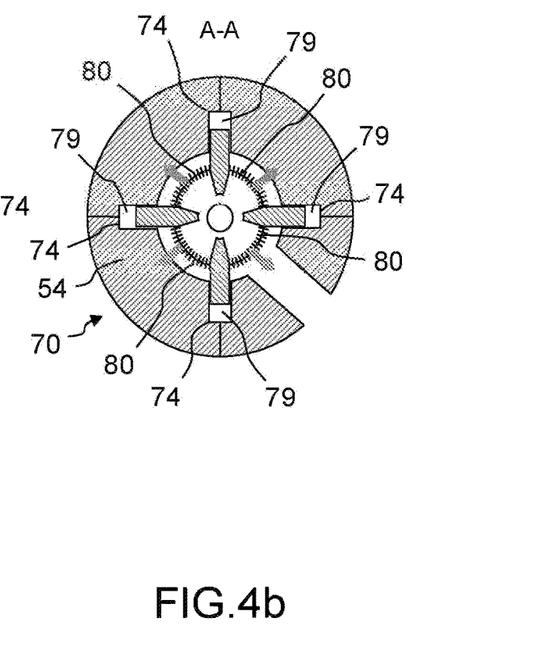
Figure 4C:
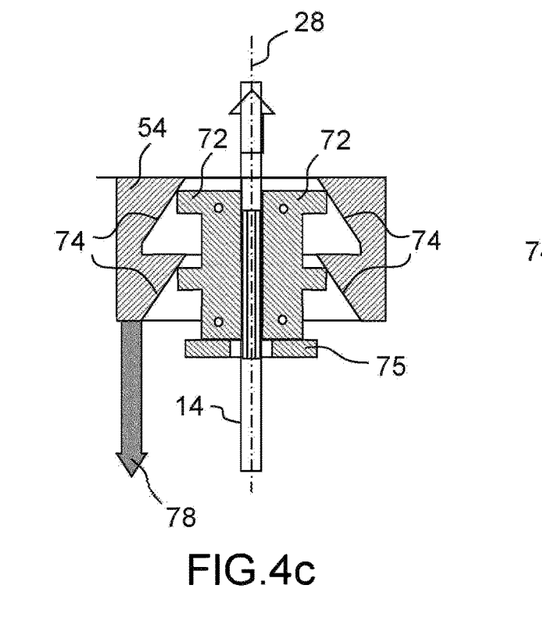
Figure 4D:
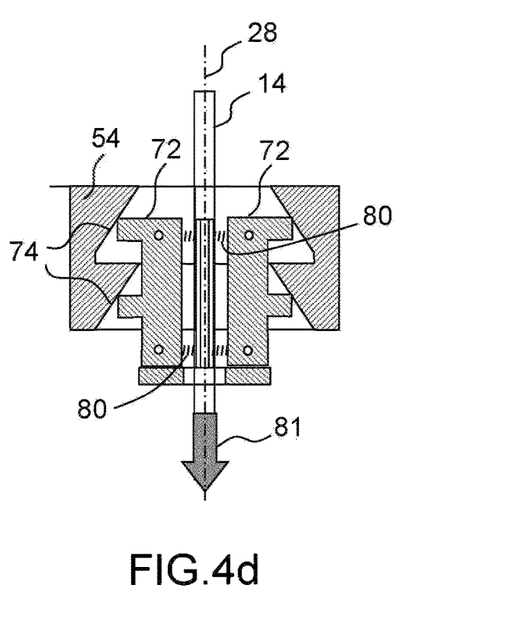

FIGS. 4a to 4d describe the principle of operation of the clamp 70 involved in a locking device according to the invention. FIGS. 4a, 4c and 4d show the clamp 70 in section in a plane containing the axis 28. FIG. 4b shows the clamp 70 in section in a plane perpendicular to the axis 28. More precisely, FIGS. 4a and 4b show the clamp 70 in the open position before it closes. FIG. 4c shows the clamp 70 in the closed position after it closes. FIG. 4d shows the clamp 70 in the open position after it opens.

The cable 14 passes through the clamp 70 along its axis 28, kept substantially vertical because of the weight of the antenna. In practice, the axis 28 may oscillate slightly about the vertical, particularly as a result of the meteorological conditions in which the sonar detection mission is being carried out. The important factor is that the weight of the antenna generates a component along the axis 28.

The clamp 70 comprises several jaws 72 capable of translational movement relative to one another in a direction perpendicular to the axis 28. The movement of the jaws 72 is with respect to the body 54. In other words, the body 54 forms the fixed part of the clamp 70, the part fixed solidly to the antenna. The jaws 72 form the moving part of the clamp 70. The jaws 72 come into contact with the cable 14 to immobilize it by clamping when the clamp 70 is in the closed position, and move away from the cable 14 when the clamp 70 is in the open position. In the clamp-open position, the cable 14 passes freely through the clamp 70 without contact with the jaws 72 and can slide freely between the jaws 72. The jaws 72 are advantageously uniformly distributed radially about the axis 28 and their movement is symmetrical with respect to the axis 28. Thus, the clamping of the jaws 72 onto the cable 14 allows the cable 14 to maintain its axis 28 in the two positions of the clamp 70. The clamp 70 comprises at least two jaws 72 which are on opposing sides of the axis 28. In the example depicted in the cross-sectional FIG. 4b, four jaws 72 may be seen. Other numbers of jaws 72 are of course possible.

The body 54 has as many inclined surfaces 74 as there are jaws 72. The surfaces are inclined with respect to the axis 28, so as to converge toward the axis 28 at the top. In the example depicted, the inclined surfaces 74 are produced in two parts 74a and 74b. Each inclined surface 74 may be produced in more than two parts. The corresponding jaw 72 therefore has as many contacts with the inclined surface 74 as the latter has parts. The contact or contacts between a jaw 72 and its respective inclined surface 74 may be substantially point contacts, as depicted in FIGS. 4a to 4d. These substantially point contacts reduce the friction between the jaw 72 and its respective inclined surface. Alternatively, the contact or contacts of a jaw 72 may be linear contacts along the respective inclined surface 74 thereof. The jaw 72 therefore comprises a mating inclined surface. Linear contacts allow the contact pressure to be reduced. Each jaw 72 slides along one of the inclined surfaces 74. The sliding allows the jaws 72 to transition from the open position to the closed position of the clamp 70. In practice, the translational movement of the jaws 72 along their respective inclined surface can be broken down into a vertical translational movement along the axis 28 and a horizontal translational movement perpendicular to the axis 28. The horizontal translational movement in one direction allows the jaws 72 to be clamped against the cable 14 and in the opposite direction allows the jaws 72 to be released.

The clamp 70 comprises a first actuator 75 configured to move the jaws 72 along the axis 28 in an upwards direction relative to the body 72. The upwards direction is embodied by an arrow 76. Because the jaws 72 bear against their respective inclined surface 74, the movement of the jaws 72 caused by the actuator 75 causes the jaws 72 to effect a horizontal translational movement towards the cable 14 in order to clamp them against the cable 14. The clamping of the cable 14 leads to immobilization of the cable 14 with respect to the jaw 72 and therefore with respect to the antenna 20 or 50. FIG. 4a shows the clamp 70 still in the open position at the start of operation of the actuator 75. FIG. 4b shows the clamp 70 in the closed position at the end of operation of the actuator 75.

So far as the antenna 50 is concerned, when the clamp 70 is in the open position, the body 54 supports only its own weight and possibly part of the weight of the arms 52, on account of the hinge 68. This weight is embodied by an arrow 77 in FIG. 4a. By contrast, when the clamp 70 is in the closed position, the weight of the antenna, embodied by an arrow 78 in FIG. 4b, is reacted in full by the body 54 from which all of the components of the antenna 50 are suspended.

Under the effect of the inclined surfaces 74, the weight 78 generates a horizontal component which tends to enhance the clamping of the jaws 72 against the cable 14. The clamp 70 may be self-locking as will be seen later on. Even without the self-locking configuration, the weight 78 of the antenna 50 contributes to the clamping of the jaws 72. The energy needed for clamping the clamp 70 is thereby already reduced.

The actuator 75 may be a linear hydraulic cylinder, a nut collaborating with a thread made in the body 54, a cam driven by a horizontal-axis motor and pressing against a lower face of the jaws 72 or any other means allowing the jaws 72 to be moved vertically.

It is possible to provide guide means guiding each of the jaws 72 so that the jaw remains in contact with its respective inclined surface. For example, it is possible to provide, for each of the inclined surfaces 74, a groove 79, for example a T-shaped or dovetail groove running along the inclined surface 74 and maintaining contact between the jaw 72 and its respective inclined surface 74. Alternatively, and to simplify the design of the clamp 70, the clamp 70 advantageously comprises elastic elements 80 configured to move the jaws 72 away from the cable 14. The elastic elements 80 allow the jaws 72 to remain constantly bearing against their respective inclined surface 74. The elastic elements 80 are, for example, positioned between each of the jaws 72 and more specifically between two consecutive jaws 72. By tending to part the jaws 72 from one another, the elastic elements 80 move the jaws 72 away from the cable 14.

The actuator 75 may be a double-acting actuator. In other words, the actuator 75 may move the jaws 72 upward and downward; upward to close the clamp 70 and downwards to open the clamp 70. Because of the presence of the elastic elements 80, the actuator 75 may be a single-acting actuator. More specifically, the actuator 75 may push the jaws 72 only upwards, the downwards return of the jaws 72 being provided by the thrust of the elastic elements which force the jaws 72 downwards under the effect of the inclined surfaces 74.

Where elastic elements 80 or a double-acting actuator 75 are/is present, it is possible to dispense with the special shape of the grooves 79 which are configured to keep the jaw 72 concerned bearing against its respective inclined surface 74. However, it is advantageous to provide a groove 79 that simply provides the lateral guidance of the jaws 72, each in a vertical plane. The inclined surface 74 associated with the jaw 72 concerned thus forms the bottom of the groove 79.

The clamp 70 comprises a second actuator configured to pull downwards on the cable 14 with respect to the body 54 along the axis 28. The action of the second actuator is depicted by the arrow 81 in FIG. 4d. The second actuator allows the opening of the clamp 70. Any type of actuator able to pull on the cable 14 may be employed. When a winch is present in the antenna, the second actuator is advantageously the winch 26. Starting from the closed position of the clamp 70 depicted in FIG. 4c, by pulling downwards on the cable 14, the jaws 72, still clamped on the cable 14, are forced downwards, slide along their respective inclined surface 74 and therefore tend to unclamp themselves from the cable 14. Under the effect of the elastic elements 80, the unclamping continues until the clamp 70 reaches the open position depicted in FIG. 4d. The presence of the elastic elements 80 allows the clamp 70 to be opened as wide as possible in order to minimize the risk of friction between the jaws 72 and the cable 14 when the clamp 70 is in the open position. Moreover, the presence of the elastic elements 80 simplifies the action of the second actuator in its action for opening the clamp 70. Specifically, right from the start of the pull on the cable 14, the clamping of the jaws 72 onto the cable 14 disappears and the jaws 72 are then driven by the elastic elements 80 along the respective inclined surface 74 thereof, and the clamp 70 reaches its open position. In practice, during an acoustic-detection phase, the clamp 70 is in the closed position. At the end of this phase, when there is a desire to raise the antenna back onto the carrier, all that is required is actuation of the winch 26 to open the clamp 70 and raise the antenna back up. One single actuator is needed for opening the clamp 70 and for raising the antenna back up.

Figure 5:
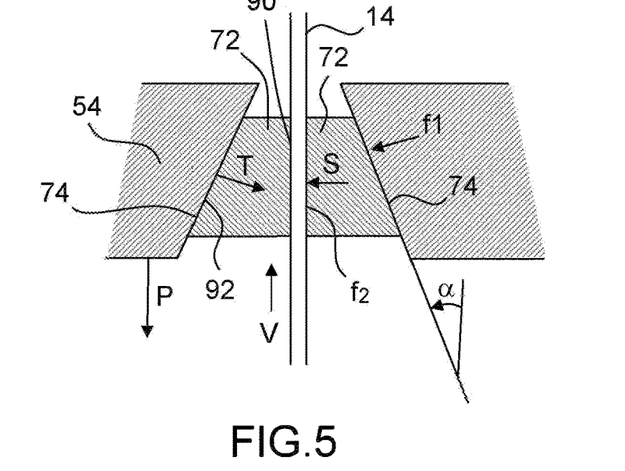
FIGS. 5 and 6 illustrate the parameters to be selected in order to succeed in achieving a self-locking clamp.
Figure 6:
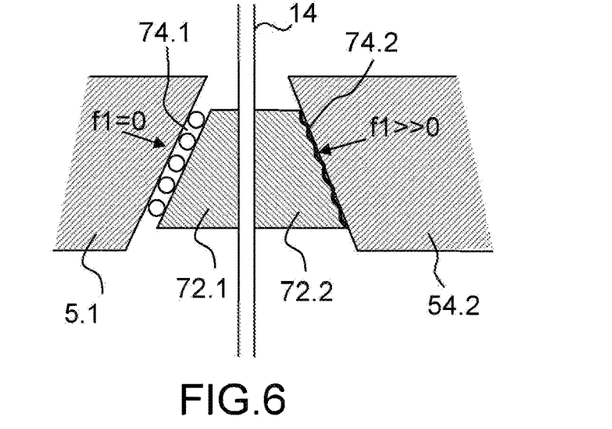

FIGS. 5 and 6 illustrate the parameters to be selected in order to obtain a self-locking clamp 70. Such a clamp allows the actuator 75 to be operated only for achieving the clamping of the clamp 70. Once clamping is achieved, it is possible to interrupt the operation of the actuator 75. The weight 78 of the antenna is enough to keep the clamp 70 closed.

Two jaws 72 inside the body 54 are shown in FIG. 5. The inclination of the inclined surfaces 74 is represented by an angle $\alpha$. The clamp 70 is in the closed position. Hereinafter, it will be assumed that the clamp 70 comprises only two jaws 72. The reasoning that follows applies to a greater number of jaws 72. It is also assumed that the inclined surfaces 74 of the two jaws 72 all have the same inclination $\alpha$. The weight 78 of the antenna is denoted P. At each inclined surface 74, the weight P can be broken down into two forces T each applied to one jaw 72. Because of the inclination $\alpha$:

$$T=P/\sin \alpha$$

At the interface between each jaw 72 and the cable 14, the force T can be broken down into a clamping force S:

$$S=T \cos \alpha$$

which gives:

$$S=P/\tan \alpha$$

The clamping of the cable 14 can lead to immobilization of said cable only if there is a coefficient of friction, denoted f2, between the jaws 72 and the cable 14. If the vertical force exerted on the cable as a result of the clamping of the jaws 72 is denoted V, then:

$$V=f2 \cdot S$$

which gives:

$$V=f2 \cdot P/\tan \alpha$$

In order for the weight P to be sufficient to keep the cable 14 immobilized as a result of the clamping of the jaws 72, or in other words, in order for the clamp (70) to be self locking, it is necessary that $$f2 \cdot P/\tan \alpha \geq P$$

which gives:

$$P(f2/\tan \alpha - 1) \geq 0$$

therefore:

$$f2 \geq \tan \alpha$$

The condition that predicts that the coefficient of friction f2 between the jaws 72 and the cable 14 needs to be greater than or equal to the tangent of the inclination α of the inclined surfaces assumes the absence of friction at the contact between the jaws 72 and their respective inclined surfaces 74.

FIG. 6 illustrates the possibility of employing a clamp in which the friction, denoted f1, at the contact between the jaws 72 and their respective inclined surfaces 74 is non-zero. The left-hand part of FIG. 6 considers zero friction f1, something which in practice can be achieved only by fitting rolling bearings between the body, here bearing the reference numeral 54.1, and the jaw 72.1. It is also possible, for the contact surfaces, to employ materials with a very low coefficient of friction, such as polytetrafluoroethylene (PTFE) for example. The right-hand part of FIG. 6 considers non-zero friction f1 between the body 54.2 and the jaw 72.2. In the second instance, the abovementioned condition that allows the clamp 70 to be self locking, can be written:

$$f2 \geq \tan(\alpha + \text{Arc}\tan f1)$$

In order to properly equalize the forces experienced by each of the jaws 72, these advantageously each have a cross section in the shape of a rectangular trapezium in a radial plane about the axis 28 of the cable 14. The radial plane is that of FIGS. 4a, 4c, 4d, 5 and 6. The rectangular trapezium is clearly visible in FIGS. 5 and 6. The rectangular trapezium has a side 90 flanked by two right angles and parallel to the axis 28 of the cable 14. The side 90 belongs to a first face 91 of the jaw 72 that comes to press against the cable 14. The side 92 of the trapezium, opposite the side 90, belongs to a second face of the jaw 72 that comes into contact with the inclined surface 74.

Figure 7:
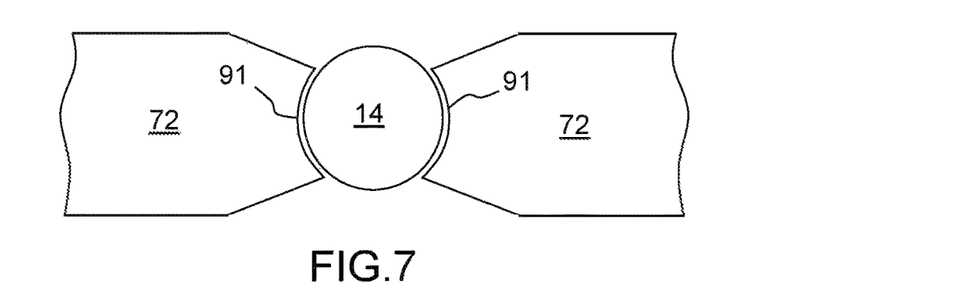
FIG. 7 shows the clamp in partial section in a plane perpendicular to the axis of the cable supporting the antenna.

FIG. 7 shows, in partial section in a plane perpendicular to the axis 28, the cable 14 clamped between two jaws 72. FIG. 7 illustrates one example of the shape of the face 91 of the jaws 72, which is the face that comes into contact with the cable 14. The face 91 has a shape that complements that of the cable 14. In the example depicted, the cable 19 has a circular section. The faces 91 of each of the jaws 72 are therefore shaped as portions of a cylinder. The cable 14 could have a cross section different from a circular cross section. The faces 91 of the jaws would then mirror the cross section of the cable. The complementary shapes of the jaws 72 and of the cable 14 enable the pressure applied by the jaw 72 to the cable 14 to be reduced. By limiting the pressure, the cable 14 deforms only little under the clamping of the jaws 72. Alternatively, it is possible to conceive of regions of higher compression, for example by giving the face 91 a V-shape with the circular-section cable 14 coming into contact between the branches of the V.

In FIGS. 4a to 4d, the body 54 forms the fixed part of the clamp 70. Alternatively, the fixed part of the clamp may float relative to the body 54. When the clamp is in the open position, the fixed part may maintain at least a degree of freedom of translational movement along the axis 28 with respect to the body 54. This degree of freedom facilitates closure of the clamp when the antenna 50 is being lowered or raised. This degree of freedom allows the friction between the movable portion and the cable 14 during closure of the clamp to be limited.

Figure 8A:
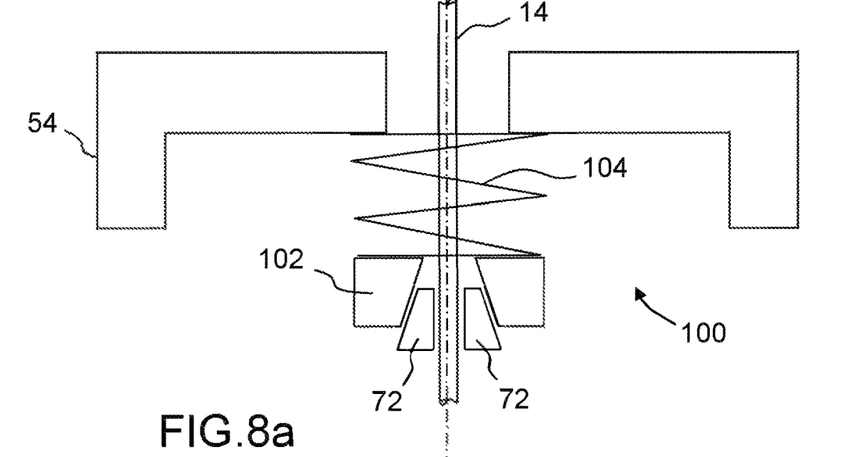
FIGS. 8a, 8b and 8c illustrate a variant of the clamp.
Figure 8B:
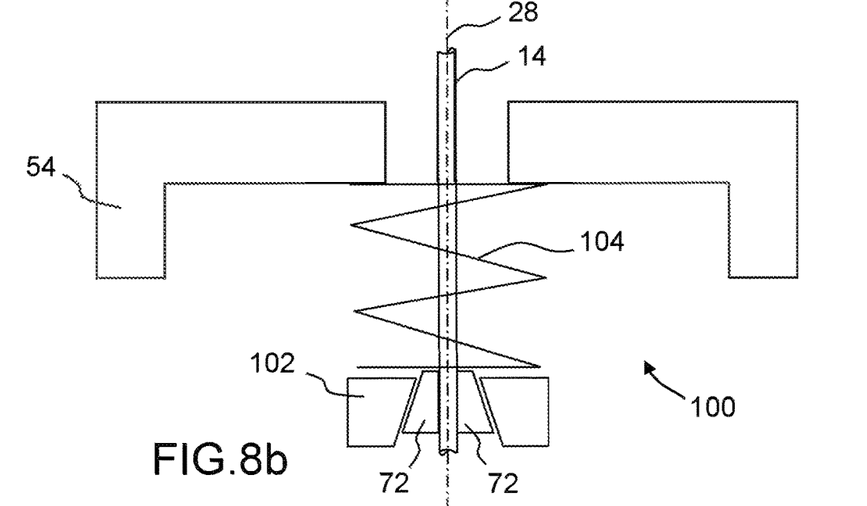
Figure 8C:
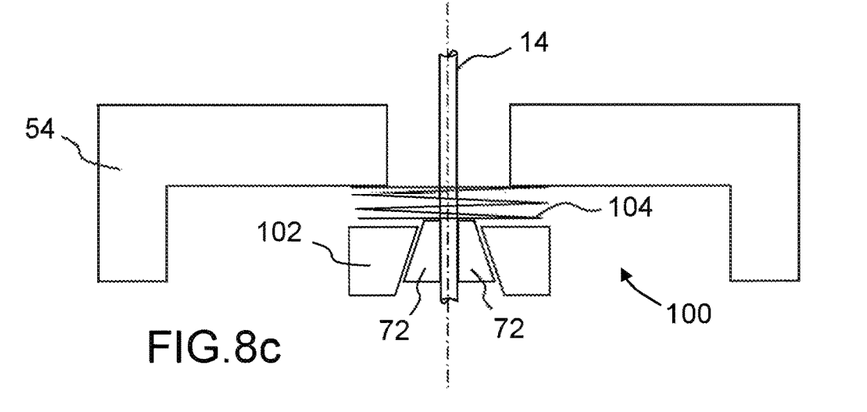

More specifically, in FIGS. 8a, 8b and 8c, the clamp bears the reference 100 and its fixed part, in which the inclined surfaces 74 are created, bears the reference 102. The fixed part 102 is connected to the body 54 while allowing a translational movement along the axis 28 between the body 54 and the fixed part 102. A spring 104 connects the fixed part 102 to the body 54. The spring 104 may compress, bringing the fixed part 102 closer to the body 54. In FIG. 8a the clamp 100 is in the open position. The fixed part 102 is situated below the body 54 some distance from the body 54. The cable 14 may run freely between the jaws 72. FIG. 8b depicts the start of closure of the clamp 100. More specifically, the actuator 75, not shown here, moves the jaws 72 to bring them to press against the cable 14. At the start of clamping, the spring 104 remains still relaxed as in FIG. 8a. Thereafter, as depicted in FIG. 8c, gravity acts on the body 54 and the spring 104 becomes compressed, bringing the fixed part 102 into abutment against the body 54, via the spring 104 which is completely compressed. Alternatively, it is possible to provide specific end stops directly between the fixed part 102 and the body 54. In other words, in the position of FIG. 8c, the degree of freedom of the clamp 100 to move translationally relative to the body 54 along the axis 28 is eliminated.

The spring 104 further allows the fixed part 102 flexibility with respect to the body 54 in the other degrees of freedom. This may improve the centering of the cable 14 as it passes through the clamp 100. In other words, aside from the degree of freedom to effect a translational movement along the axis 28, the other degrees of freedom may offer an advantage. As an alternative to the presence of the spring 104, any other slideway along the axis 28 that allows the fixed part 102 a translational movement with respect to the body 54 may be employed. This translational movement allows the slipping of the cable 14 between the jaws 72 during closure of the clamp 100 to be limited. More precisely, it may be desirable to clamp the clamp while the antenna is being lowered. With a clamp 70 of which the fixed part is secured to the body 54 during the clamping of the clamp, the antenna loses speed and the clamp acts as a brake, rubbing against the cable 14. All of the kinetic energy of the antenna is dissipated in this friction, leading to wearing of the cable 14 and of the jaws 72. By contrast, with the clamp 100, only the kinetic energy due to the mass of the clamp 100 is dissipated by friction against the cable 14. Because the clamp 100 has a mass very much lower than that of the entirety of the antenna, and at most, less than half the mass of the antenna, the majority of the kinetic energy of the antenna is converted into potential energy in the compression of the spring 104, which then limits the energy dissipated by friction between the jaws 72 and the cable 14 and therefore the wearing of these jaws and this cable. If it is desirable to close the clamp while the antenna is being raised back up, a reverse mounting of the spring 104 is possible. It is also possible to arrange the fixed element 102 between two springs so as to dissipate the kinetic energy of the antenna both while it is being lowered and while it is being raised back up towards the carrier.

The spring 104 may be replaced by other types of elastic elements such as elastomers. The elastic element may have damping properties able to dissipate the potential energy derived from the kinetic energy of the clamp. For example, it is possible to employ a damper in place of or in addition to the spring 104. Certain elastomer materials also offer damping properties in addition to their elastic property.

The compression of the spring 104 in order to limit the friction on the cable works both when lowering and when raising the antenna. In the example depicted in FIGS. 8a, 8b and 8c, the spring 104 becomes compressed as the clamp is clamped. Alternatively, it is possible to conceive of a spring that becomes tensioned as the clamp is clamped. The bottom of the fixed element 102 is then fixed to a spring which is itself fixed to the body 54, this time situated below the fixed element 102. It is also possible to position the fixed element 102 between two springs, each of them fixed on the one hand to the fixed element 102 and on the other hand to the body 54.

The setup described using FIGS. 8a to 8c is described for implementation with the clamp 70. Such a setup with an elastic element 104 may be employed for other types of clamp.

The invention claimed is:

1. A locking device for locking an object suspended from a cable, the device comprising a cable and a clamp, the cable passing through the clamp and extending along a substantially vertical axis, the clamp comprising: a fixed part connected to the object, at least two moving jaws, a first actuator and a second actuator, the two jaws being capable of translational movement relative to one another in a direction perpendicular to the axis of the cable, the two jaws coming into contact with the cable to immobilize the cable by clamping in a closed position and moving away from the cable in an open position, the fixed part having as many inclined surfaces as there are jaws, the inclined surfaces being inclined with respect to the axis of the cable so as to move closer to the axis of the cable toward the top, each of the jaws being configured to slide along one of the inclined surfaces allowing the jaws to pass from the open position to the closed position, the clamp further comprising elastic elements configured to move the jaws away from the cable, the first actuator being configured to move the jaws upward, to slide each of the jaws along one of the inclined surfaces and allow the clamp to close, the second actuator being configured to pull downward on the cable with respect to the fixed part and allow the clamp to open.

2. The locking device as claimed in claim 1, wherein the elastic elements are positioned between each of the jaws and tend to part the jaws from one another.

3. The locking device as claimed in claim 1, wherein the jaws are uniformly distributed radially about the axis of the cable and wherein the movement of the jaws is symmetrical with respect to the axis of the cable.

4. The locking device as claimed in claim 1, wherein the fixed part comprises as many grooves as there are jaws, each jaw sliding in one of the grooves, the inclined surface associated with the jaw concerned forming a bottom of the groove, the groove being configured to provide lateral guidance for the jaw concerned in a radial plane about the axis of the cable.

5. The locking device as claimed in claim 1, wherein, in a radial plane about the axis of the cable, each jaw has a cross section substantially in the shape of a rectangular trapezium of which a first side, flanked by two right angles, is parallel to the axis of the cable and belongs to a first face of the jaw concerned, the first face being configured to come to press against the cable and of which a second side, opposite the first side, belongs to a second face of the jaw concerned, the second face coming into contact with an inclined surface.

6. The locking device as claimed in claim 1, wherein the inclined surfaces are inclined by an angle $\alpha$ with respect to the axis of the cable, wherein a coefficient of friction $f2$ is defined between the jaws and the cable and wherein the coefficient of friction $f2$ is greater than or equal to the tangent of the angle $\alpha$ so as to render the clamp self-locking under the effect of the weight of the object.

7. The locking device as claimed in claim 6, wherein a coefficient of friction $f1$ is defined between each jaw and the corresponding inclined surface, the coefficient of friction $f1$ being substantially zero.

8. The locking device as claimed in claim 6, wherein a coefficient of friction $f1$ is defined between each jaw and the corresponding inclined surface, and wherein the coefficient of friction $f2$ is greater than or equal to the tangent of the sum of the angle $\alpha$ and of the arc-tangent $f1$ so as to render the clamp self-locking under the effect of the weight of the object.

9. The locking device as claimed in claim 1, wherein the second actuator is a winch positioned inside the object and configured to haul in and pay out the cable.

10. The locking device as claimed in claim 1, wherein each jaw comprises a first face that comes to press against the cable, and wherein the first face has a shape complementing that of the cable.

11. The locking device as claimed in claim 1, wherein the fixed part has a degree of freedom of translational movement along the axis with respect to the object.

12. The locking device as claimed in claim 11, wherein the fixed part is connected to the object by means of a second elastic element.

13. The locking device as claimed in claim 12, wherein the second elastic element is configured to allow flexibility of the fixed part with respect to the object in translational movement along the axis and also in other degrees of freedom.

14. The locking device as claimed in claim 12, wherein the elastic element is configured to convert the majority of the kinetic energy of the object into potential energy in the deformation of the elastic element.

15. The locking device as claimed in claim 12, wherein the elastic element has damping properties able to dissipate the potential energy derived from the kinetic energy of the object.

* * * * *